US008782668B1

(12) United States Patent
McCreesh et al.

(10) Patent No.: US 8,782,668 B1
(45) Date of Patent: Jul. 15, 2014

(54) EVENT PROCESSING USING EXISTING COMPUTER EVENT CAPTURE MODULES (75) Inventors: Martin McCreesh, Dunleer (IE); Christopher Jerome Schnurr, Culmore (GB)

(73) Assignee: Verint Americas Inc., Alpharetta, GA (US)

( * ) Notice: Subject to any disclaimer, the term of this patent is extended or adjusted under 35 U.S.C. 154(b) by 198 days.

(21) Appl. No.: 13/323,240

(22) Filed: Dec. 12, 2011

Related U.S. Application Data (60) Provisional application No. 61/422,020, filed on Dec. 10, 2010, provisional application No. 61/422,177, filed on Dec. 12, 2010, provisional application No. 61/422,179, filed on Dec. 12, 2010, provisional application No. 61/422,183, filed on Dec. 12, 2010, provisional application No. 61/422,185, filed on Dec. 12, 2010, provisional application No. 61/422,186, filed on Dec. 12, 2010, provisional application No. 61/422,189, filed on Dec. 12, 2010, provisional application No. 61/438,108, filed on Jan. 31, 2011.

(51) Int. Cl.
G06F 3/00 (2006.01)
G06F 9/48 (2006.01)
G06F 9/54 (2006.01)

(52) U.S. Cl.
CPC .............. *G06F 9/542* (2013.01); *G06F 9/4812* (2013.01)
USPC ........................................................ 719/318

(58) Field of Classification Search
CPC .... G06F 9/542; G06F 9/4812; G06F 2201/86
See application file for complete search history.

(56) References Cited

PUBLICATIONS

Peter Pirolli, The Sensemaking Process and Leverage Points for Analyst Technology as Identified Through Cognitive Task Analysis, 2005.*

* cited by examiner

*Primary Examiner* — Lechi Truong
(74) *Attorney, Agent, or Firm* — Meunier Carlin & Curfman (57) ABSTRACT Embodiments disclosed herein provide systems and methods for processing events using existing computer event capture modules. In a particular embodiment, a method provides a primary event module communicating with an operating system to detect application events generated by user input and processing the application events to determine if a primary event has occurred. The method further provides a secondary event module communicating with the primary event module to obtain an indication of the application events detected by the primary event module and processing the application events to determine if a secondary event has occurred.

14 Claims, 11 Drawing Sheets

EVENT PROCESSING USING EXISTING COMPUTER EVENT CAPTURE MODULES

RELATED APPLICATIONS

This application claims the benefit of U.S. Provisional Applications No. 61/422,020, 61/422,177, 61/422,179, 61/422,183, 61/422,185, 61/422,186, and 61/422,189, filed Dec. 12, 2010, and 61/438,108, filed Jan. 31, 2011, which are hereby incorporated by reference in their entirety.

TECHNICAL BACKGROUND

Entities such as businesses, educational institutions, and individuals use computers routinely to accomplish tasks. The tasks can vary widely depending on the user and what the user needs to perform. Usually the tasks are accomplished using various computer applications that may each be used in various ways. Thus, there may be more than one way for a user to accomplish a task using the applications on the computer of the user. Having multiple ways of accomplishing tasks may make it difficult to track the activity of the user or may also make it difficult for the user to determine whether the user is accomplishing the task appropriately.

OVERVIEW

Embodiments disclosed herein provide systems and methods for processing events using existing computer event capture modules. In a particular embodiment, a method provides a primary event module communicating with an operating system to detect application events generated by user input and processing the application events to determine if a primary event has occurred. The method further provides a secondary event module communicating with the primary event module to obtain an indication of the application events detected by the primary event module and processing the application events to determine if a secondary event has occurred.

In some embodiments, the primary event module comprises a browser helper object and the user input is entered into web page displayed in a web browser application.

In some embodiments, the primary event module comprises an accessibility application programming interface (API) for the operating system.

In some embodiments, the method further provides processing the application events to using recursive substring analysis to identify events that are likely to follow one another. The method further provides creating a matrix of the application events that are likely to follow one another and graphically displaying the matrix including a visual indication of the application events that are likely to follow one another.

In some embodiments, the indication of the application events includes an occurrence time and event type for each application event and the method further includes the secondary event module receiving schedule information regarding a schedule for use of a plurality of computer workstations and determining a metric for whether each of the plurality of computer workstations is in use based on the schedule information, occurrence time, and event type. The method further includes determining a number of occupied seats in a room based on the metric.

In some embodiments, the indication of the application events includes an occurrence time for each application event and the method further includes the secondary event module receiving process definitions that each defines a process based on a sequence of events and receiving telephony events, wherein each telephony event indicates an occurrence time. The method further includes processing the application events and the telephony events to determine whether a subset of the application events and telephony events is a first process based on the process definitions. The method further includes, determining an occurrence time for the first process based on the occurrence times for the subset of the application and telephony events and displaying the first process on a timeline along with the application events and the telephony events in accordance with the occurrence times of the first process, the application events, and the telephony events.

In some embodiments, the method further includes the secondary event module receiving an indication of the user input from the primary event module and determining a user action that should be taken with the computer system by a user based on the user input and the application events. The method further includes generating an instruction to notify the user about the user action that should be taken.

In some embodiments, the method further comprises the secondary event module receiving process definitions that each define a process based on a sequence of events and processing the application events to determine whether a subset of the application events comprises a first process based on the process definitions even if the subset of application events includes application events that are extraneous to a definition for the first process. The method further includes processing the application events a second time to determine whether a second subset of the application events comprises an incomplete process based on the process definitions even if the second subset of application events includes application events that are extraneous to a definition for the incomplete process.

In another embodiment, non-transitory computer readable medium with instructions stored thereon is provided for operating a computer system to process computer events, wherein the instructions, when executed by the computer system, direct the computer system to communicate with a primary event module to obtain an indication of application events detected by the application enhancement event module, wherein the primary event module communicates with an operating system to detect the application events generated by user input and determine if a primary event has occurred based on the application events. The instructions further direct the computer system to process the application events to determine if a secondary event has occurred and process the application events to determine if a business process has occurred.

In another embodiment, a method provides communicating with a primary event module to obtain an indication of application events detected by the application enhancement event module, wherein the primary event module communicates with an operating system to detect the application events generated by user input and determine if a primary event has occurred based on the application events. The method further includes processing the application events to determine if a secondary event has occurred.

In some embodiments, the secondary event is a business process.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
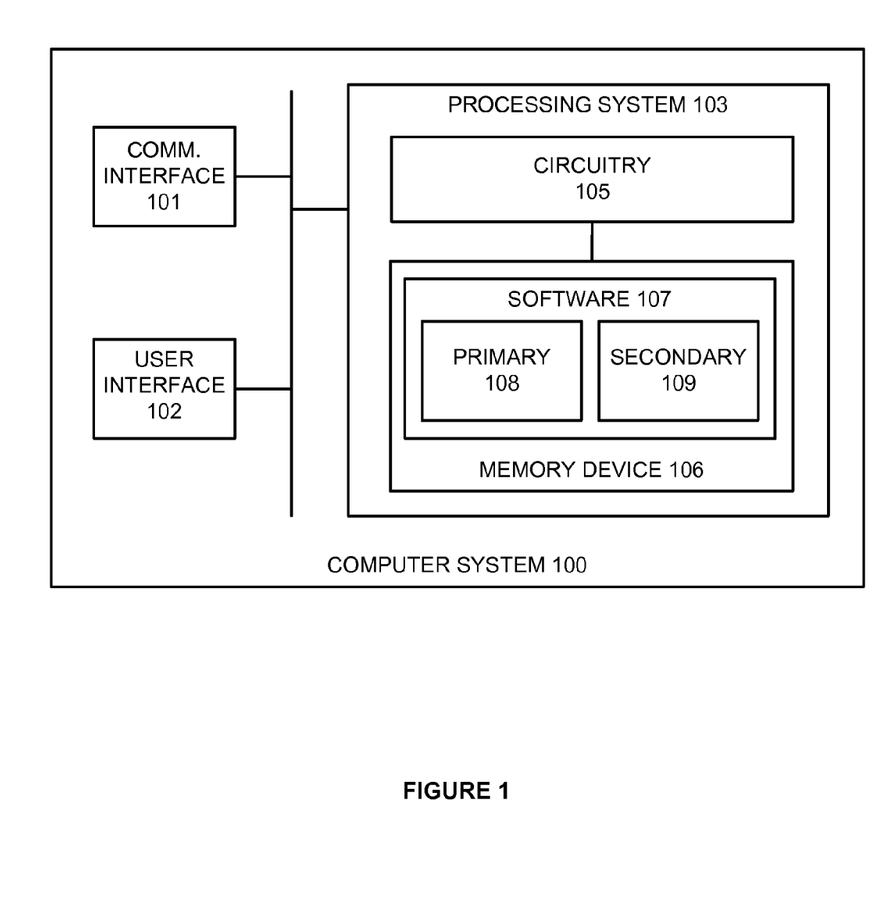
FIG. 1 illustrates a computer system for processing computer events.

FIG. 1 illustrates computer system 100. Computer system 100 comprises communication interface 101, user interface 102, and processing system 103. Processing system 103 is linked to communication interface 101 and user interface 102. Processing system 103 includes processing circuitry 105 and memory device 106 that stores operating software 107. Operating software 107 includes primary event module 108 and secondary event module 109 for processing events occurring on computer system 100 in the manner described below. Computer system 100 is exemplary and may take other forms. In some embodiments, secondary event module 109 may be executing on a computer system other than computer system 100 and therefore may interact with primary event module over a network connection between the two computer systems.

Figure 2:
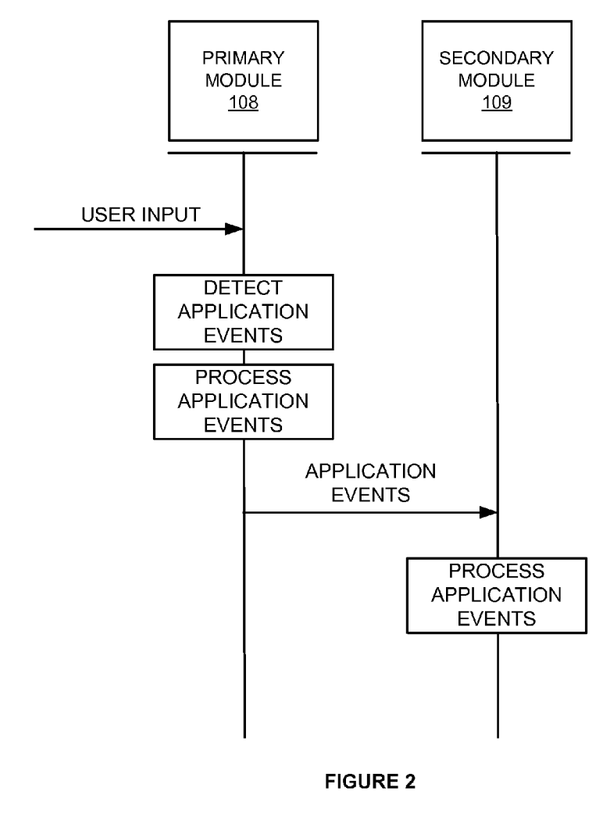
FIG. 2 illustrates the operation of the computer system for processing computer events.

FIG. 2 illustrates the operation of computer system 100. In operation, computer system 100 may be a personal computer workstation or any other type of computer system that is capable of executing software applications that receive user input. Primary event module 108 is executing on processing system 103 in order to detect events that occur on computer system 100. Primary event module may be a software module that is included in an operating system for computer system 100 or in an application running within the operating system.

Primary event module 108 communicates with the operating system to detect application events generated by user input into user interface 102. The user input may be any type of user input, such as mouse click, keyboard entry, or touch screen gesture, that interacts with an application executing within the operating system or on with the operating system itself. The application events may be user notifications, events occurring directly in reaction to user input, events caused by the normal execution of an application, or any other type of event that may occur on a computer system, including those in the operating system and applications running on the operating system. Primary event module 108 then processes the application events to determine if a primary event has occurred. A primary event is an event that primary event module 108 is programmed to detect based on the application events. Other application events that do not qualify as a primary event are thereby ignored by primary event module 108. Primary event module 108 may direct computer system 100 to take a particular action based on the detection of the primary event.

Secondary event module 109 communicates with the primary event module to obtain an indication of the application events detected by the primary event module. The indication may be any type of message that can be sent between two software modules that indicates the application events that were detected by primary event module 108. Secondary event module 109 may request the indication of the application events or primary event module 108 may be configured to automatically make the application events available to secondary event module 109. The application events indication may be transferred to secondary event module 109 in real time as each event happens or may be periodically sent in blocks of multiple application events at later times.

Secondary event module 109 then processes the application events to determine if a secondary event has occurred. A secondary event is an event that secondary event module 109 is programmed to detect based on the application events. Other application events that do not qualify as a secondary event are thereby ignored by secondary event module 109. Secondary event module 109 may direct computer system 100 to take a particular action based on the detection of the secondary event. The secondary event may be the same or different than the primary event and, if they are the same, the action taken based on the secondary event may be different than the action taken by the primary event.

Advantageously, both the primary and the secondary event modules process the application events in order to determine whether a particular primary or secondary event has occurred. Accordingly, the primary and secondary event modules are able to each individually process the application events to detect a primary and secondary event, respectively. This allows the primary and secondary event modules to detect different events from the application events and take different actions in accordance with each modules individual programming. Additionally, by using the primary event module's application event detection, the secondary event module is able to perform application event processing without the necessary mechanisms for detecting the application events themselves.

In an exemplary embodiment of the above method, primary event module 108 may comprise a browser helper object that is running in conjunction with a web browser application within the operating system of computer system 100. A browser helper object is a mechanism of the web browser that typically allows third party applications to augment the Internet browser experience. For example, antivirus software may use a browser helper object to recognize and highlight trusted links in a web page by injecting additional HTML code into the web page that instructs the links to be highlighted.

The browser helper object receives a user input into a web page that the web browser is displaying. The web page may be any type of web page capable of being displayed on a display in user interface 102. The user input may be received via touch input into the aforementioned display or through some other type of user input device in user interface 102, such as a mouse or keyboard. The user input may be a single user input, such as a mouse click, or multiple inputs, such as a series of mouse clicks or mouse clicks and keyboard strokes. The user input is considered to interact with the web page if the user input acts on the web page in some way, such as entering text into a text field, clicking on a link, interacting with an object within the web page, such as a Flash app, or any other way that a user may interact with a web page in a browser.

The browser helper object then processes the user input to determine application events that occurred based on the user input and processes the application events to determine whether action should be taken. For example, if the application event is a link opening up another web page, then the browser helper object may do nothing. However, if the application event requires some other application to run in order to comply with the application event, then the browser helper object may open the required application.

The application events detected by the browser helper object are the events that are passed to the secondary event module. The secondary event module then processes the application events to determine whether a secondary action should be taken. While the application event may not have caused the browser helper object to trigger an action, the application event may cause the secondary event module to trigger an action. Likewise, both the browser helper object and the secondary event module may trigger different actions from the same application events. Some actions that may be triggered by the secondary event module are discussed below.

In an exemplary embodiment of the above method, primary event module 108 may comprise an accessibility application programming interface (API). The accessibility API is an API that is used to comply with section 508 legal guidelines on accessibility to computer devices irrespective of any physical disability that a user of the device may have. Thus, the accessibility API is typically meant to aid a disabled user of computer system 100 in the operation of computer system 100.

The accessibility API receives user input into a first application executing within the operating system of computer system 100 or into the operating system itself. The user input may be received via touch input into the aforementioned display or through some other type of user input device in user interface 102, such as a mouse or keyboard. The user input may be a single user input, such as a mouse click, or multiple inputs, such as a series of mouse clicks or mouse clicks and keyboard strokes. The content or purpose of the user input will vary based on the functionality of the first application. For example, the first application may be a web browser, word processor, or email client.

The accessibility API then processes the user input to determine application events that occurred based on the user input and processes the application events to determine whether action should be taken. For example, if the application event selects text, then the accessibility API may trigger an audible reading of the text for the user. However, if the application event is a file save, then the accessibility API may do nothing.

The application events detected by the accessibility API are the events that are passed to the secondary event module. The secondary event module then processes the application events to determine whether a secondary action should be taken. While the application event may not have caused the accessibility API to trigger an action, the application event may cause the secondary event module to trigger an action. Likewise, both the accessibility API and the secondary event module may trigger different actions from the same application events. Some actions that may be triggered by the secondary event module are discussed below.

Figure 3:
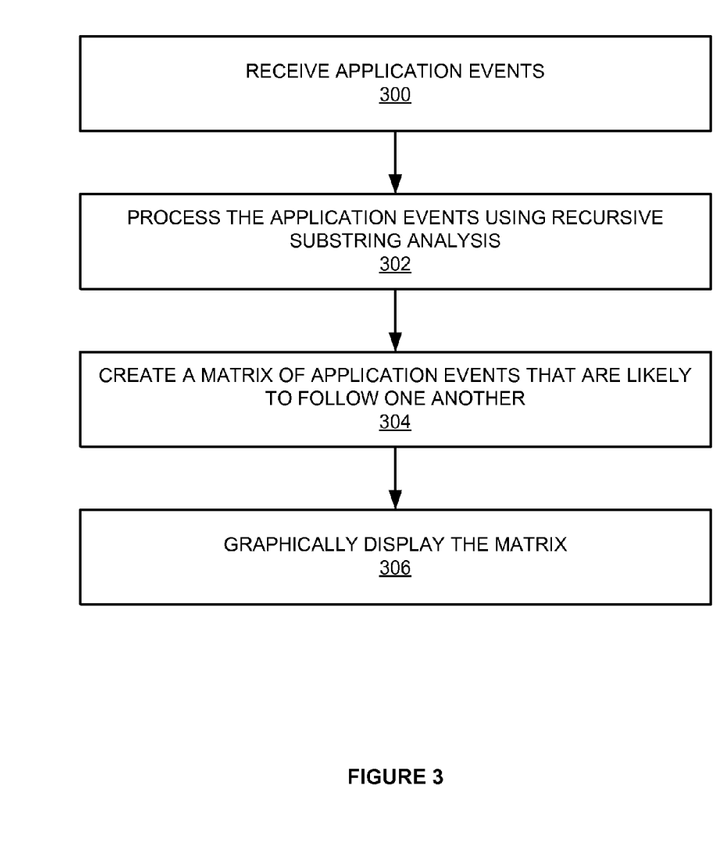
FIG. 3 illustrates the operation of the computer system for processing computer events.

FIG. 3 illustrates an embodiment of secondary event module 109 processing application events received from primary event module 108. In operation, computer system 100 may be a personal computer workstation or any other type of computer system with a display capable of displaying graphical information to a user. The operation begins with secondary event module 109 receiving the application events from primary event module 108 (step 300).

The application events are processed using recursive substring analysis to identify application events of the application events that are likely to follow one another (step 302). Thus, the recursive substring analysis determines likely event combinations from the application events. For example, a user of computer system 100 may consistently use an email application after using a contact catalog application. Hence, the processing will determine that the email application is likely to be used after the contact catalog application.

A matrix of the application events that are likely to follow one another is then created (step 304). The matrix is a data structure that stores the application events that are likely to follow one another. The matrix may be stored in memory device 106 in computer system 100 but may also be stored elsewhere, such as a network storage server or administrative computer system via communication interface 101. The matrix may include an indication as to which application event combinations are more likely to occur than other application event combinations.

Secondary event module 109 directs user interface 102 to graphically display the matrix including a visual indication of which application events are likely to follow one another (step 306). Secondary event module 109 may be executing on an administrative computer system that receives application events from primary event modules executing on many remote computer systems, including computer system 100. A diagramming application, such as Microsoft Visio, executing on processing system 103 or on another computer system may display the matrix. For example, each application event of the application events may be displayed on a diagram with application event combinations connected by lines. The thickness of the line between application events indicates the frequency of occurrence for the combination, thus, giving a user a visual representation of event combination frequency. The application event combinations may be time stamped to show which users perform the application event combinations more quickly. Additionally, a user may be able to indicate a number of standard deviations from a norm in order to display outlying event combinations as opposed to those events that occur most often.

Figure 4:
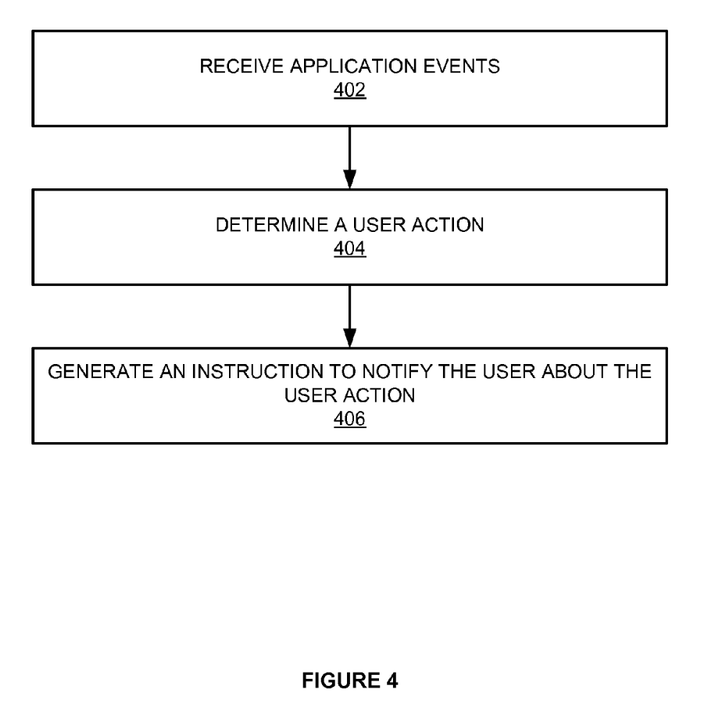
FIG. 4 illustrates the operation of the computer system for processing computer events.

FIG. 4 illustrates an embodiment of secondary event module 109 processing application events received from primary event module 108. In operation, computer system 100 may be a personal computer workstation or any other type of computer system with a display capable of displaying graphical information to a user. The operation begins with secondary event module 109 receiving the application events from primary event module 108.

Secondary event module 109 determines a user action that should be taken with the computer system by a user based on the user input and application events (step 404). The application events may occur in such a way that the next action can be determined. For example, there may be a particular sequence of application events that requires a particular action be taken. Likewise, certain events occurring within a period of time may warrant a particular action. The action could be anything that the user can perform using computer system 100, such as operating a particular application or not using another application.

Once the user action is determined, an instruction is generated to notify the user about the user action that should be taken (step 406). The instruction may use various ways to notify the user of the action. For example, the instruction may highlight objects on a display of user interface 102 in order to guide the user through the action, steer users through a process actively tracking the progress of the user and updating the script as the user proceeds, intercept user inputs based on the current state of the operating software desktop, preventing a certain user input before another user input has been completed, or indicating to a user a number of screens until the operation is completed.

Figure 5:
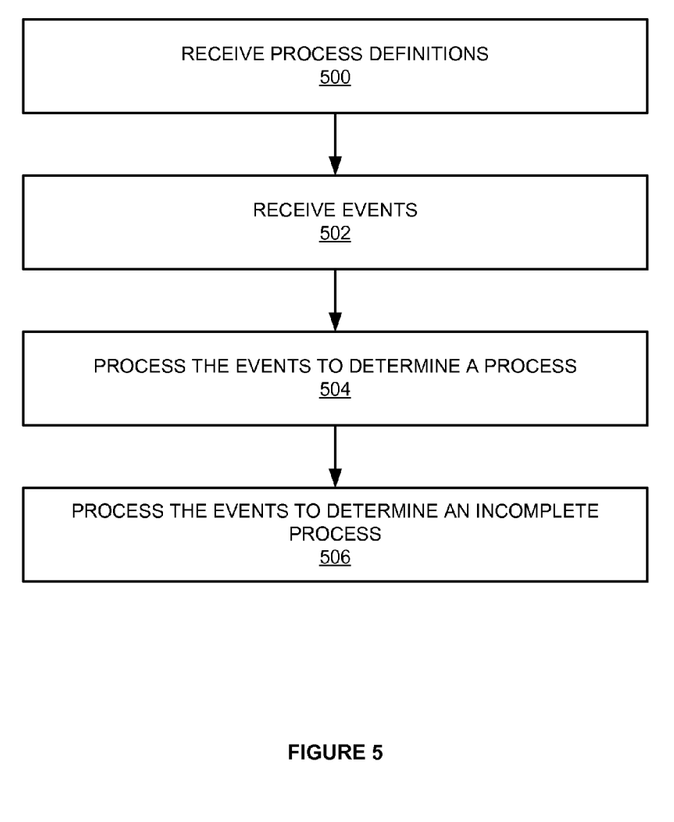
FIG. 5 illustrates the operation of the computer system for processing computer events.

FIG. 5 illustrates an embodiment of secondary event module 109 processing application events received from primary event module 108. In operation, computer system 100 may be a personal computer workstation or any other type of computer system capable of operation by a user. The operation begins with secondary event module 109 receiving process definitions that each define a process based on a sequence of events (step 500). The process definitions may be received from another computer system via communication interface 101, may be provided by a user through user interface 102, or any other way that information can be put on computer system 100. The process definitions may describe any type of process that can be performed on a computer system. In an exemplary embodiment, the defined processes may be business processes, such as a sale, return, support, invoicing, or any other business related process that can be performed using a computer system.

Secondary event module 109 further receives the application events from primary event module 108 (step 502). The application events may be user notifications, events in reaction to user input, events caused by the normal execution of an application, or any other type of event that may occur on a computer system.

The application events are processed to determine whether a subset of the application events comprises a first process based on the process definitions even if the subset of application events includes application events that are extraneous to a definition for the first process (step 504). Thus, secondary event module 109 compares the application event sequences within the application events to the sequences in each process definition to determine whether the process definition is satisfied. Additionally, the comparison finds application event sequences that match the process definitions except for one or more extraneous events in between. If secondary event module 109 determines that the extraneous events are inconsequential, then secondary event module 109 still determines that the process definition has been met. For example, if the user checks email in the middle of the events of a process before continuing the process, then the process definition will still be met even though the email check event falls in the middle of the event sequence.

The application events are then processed a second time to determine whether a second subset of the application events comprises an incomplete process based on the process definitions even if the second subset of application events includes application events that are extraneous to a definition for the incomplete process (step 506). Secondary event module 109 therefore compares the events to a first part of the process definition. If the first part of the process definition is met, even when there are extraneous intervening events, then secondary event module 109 determines that the process defined by the definition was started and abandoned before completion. The process may be considered abandoned also based on a process restart detected on the previous processing pass or an application event that signifies the abandonment of the process, such as a cancellation event. Additionally, the process may be considered abandoned based on processes that were completed before or after the abandoned process as determined on the previous processing pass. For example, if the process that was abandoned usually follows a process that was detected on the first processing pass, then the abandoned process is most likely an abandoned process and not simply random events.

Figure 6:
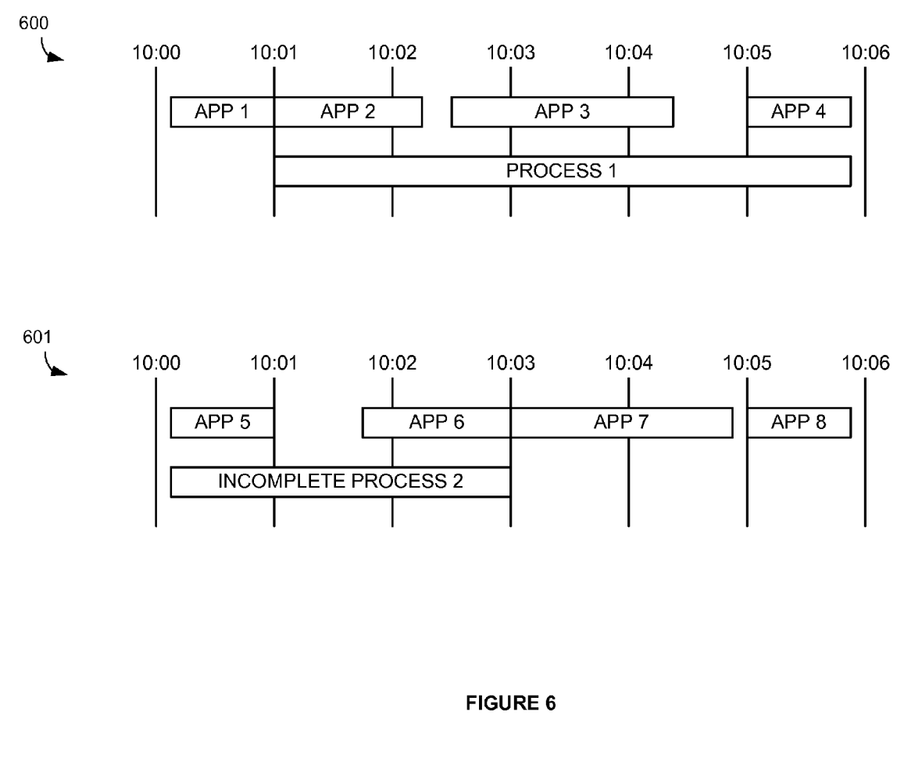
FIG. 6 illustrates a visualization of process events.

FIG. 6 illustrates timelines 600 and 601 in a visualization of application events that define a process. In timeline 600, secondary event module 109 receives application events 1-4. A process definition provides that application events 2 and 4 make up process 1. Therefore, if secondary event module 109 determines that application event 3 does not effect the occurrence of process 1, then secondary event module 109 will determine that the process definition for process 1 has been met. Similarly, in timeline 601, secondary event module 109 receives application events 5-8. A process definition provides that application events 5 and 6 are part of process 2 along with other events not received. Therefore, secondary event module 109 determines that process 2 was started and not completed.

Figure 7:
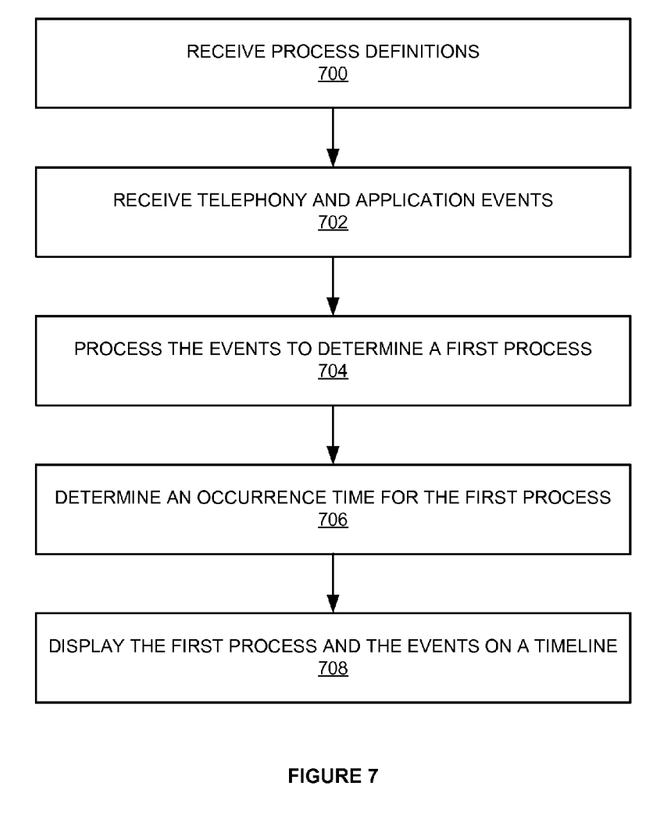
FIG. 7 illustrates the operation of the computer system for processing computer events.

FIG. 7 illustrates an embodiment of secondary event module 109 processing application events received from primary event module 108. In operation, computer system 100 may be a personal computer workstation or any other type of computer system capable of operation by a user. The operation begins with secondary event module 109 receiving process definitions that each defines a process based on a sequence of application events (step 700). The process definitions may be received from another computer system via communication interface 101, may be provided by a user through user interface 102, or any other way that information can be put on computer system 100. The process definitions may describe any type of process that can be performed on a computer system. In an exemplary embodiment, the defined processes may be business processes, such as a sale, return, support, invoicing, or any other business related process that can be performed using a computer system.

Secondary event module 109 further receives telephony events and in addition to the application events, wherein each event indicates an occurrence time (step 702). The telephony events may include any sort of event stemming from a communication with another individual, such as call answer, call hold, call hang up, or words spoken during the call. The telephony events may occur from a landline phone, a VoIP phone, audio chat, video chat, text based chat, or any other type of communication method between an agent and another individual, such as a customer or potential customer. The telephony events may be a subset of the application events that are received from primary event module 108. Alternatively, the telephony events may be received from an automatic call distributor (ACD) or any other system or software module that manages call activity. Each event, application or telephony, includes an occurrence time for the event. The occurrence time may include a start time, stop time, duration, date, or any other time related information for the event.

The telephony and application events are processed to determine whether a subset of the telephony and application events is a first process based on the process definitions (step 704). Thus, secondary event module 109 compares the event sequences within the events to the sequences in each process definition to determine whether the process definition is satisfied. For example, the process may be a sale and it may be made up of a telephony event comprising a customer saying "I agree to buy the product," along with application events that pull the product from inventory and generate a bill for the customer. In addition to the first process, there may be other processes that occur in the received events that are also determined during the processing of the telephony and application events.

An occurrence time is determined for the first process based on the occurrence times for the subset of the telephony and application events (step 706). Since processes are defined by the events that make up each process, the timing of the events that make up each process coincide with the timing of each process. For example, the start time for a process may be the time of the first event defining the process. Likewise, the time of the last event defining the process may be the end time of the process.

The first process is displayed on a timeline along with the telephony events and the application events in accordance with the occurrence times of the first process, the telephony events, and the application events (step 708). Therefore, in addition to showing time and duration of events on a timeline, the time and duration of the first process is also displayed on the timeline. This allows a user to view when a process occurred on a timeline and be able to associate the timing of the process with the timing of the events that make up the process, which are also displayed on the same timeline.

Figure 8:
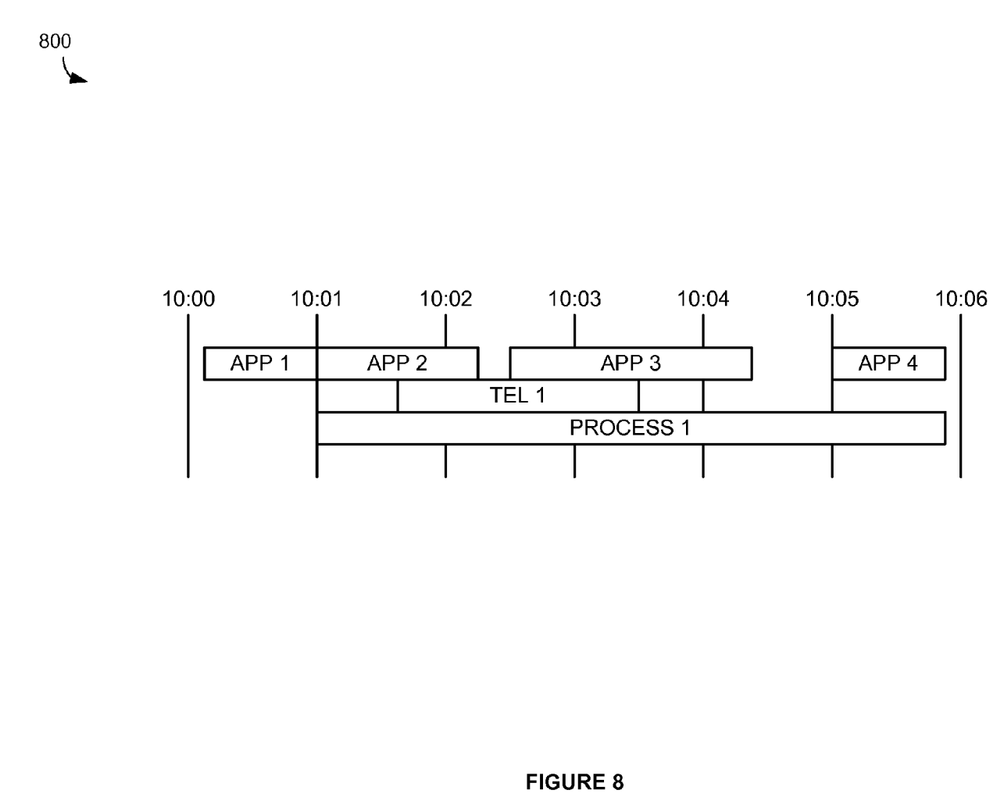
FIG. 8 illustrates a timeline for displaying processed computer events.

FIG. 8 illustrates timeline 800 in an example of a timeline displaying the events and processes determined above. Timeline 800 illustrates telephony event 1 and application events 1-4 in accordance with their occurrence times and durations. In this example, all events occurred between 10:00 and 10:06. Additionally, each event displayed has a duration but, in some embodiments, one or more of the events may be an instantaneous event, such as an individual mouse click.

Telephony event 1 along with application events 2, 3, and 4 make up process 1. Therefore, process 1 is displayed having a duration extending from the first event that occurred (application event 2) to the last event that occurred (application event 4). Application event 1 is not part of process 1, thus process 1 does not extend to the time period of application event 1. An expanded view of table 800 may show additional events and processes that occur outside of the 10:00-10:06 time frame. In some embodiments, application events 2-4 may apply to multiple processes, not just process 1.

Figure 9:
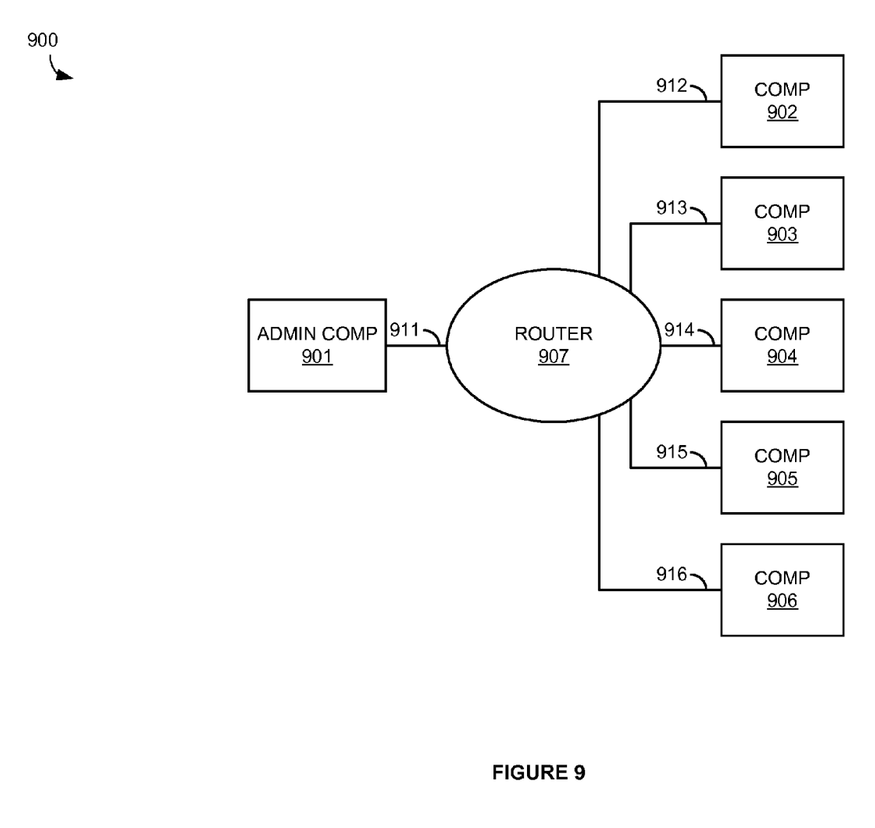
FIG. 9 illustrates a network computer system for processing computer events.

FIG. 9 illustrates network computer system 900. Network computer system 900 includes administrative computer system 901, computer systems 902-906, and network router 907. Administrative computer system 901 and computer systems 902-906 communicate over communication links 911-917 via router 907. Communication links 911-917 may be any type of link or combination of links that connect computers, such as Ethernet or Wi-Fi. There may be other intervening elements, systems, and devices, such as switches and the Internet. Administrative computer system 901 and computer systems 902-906 may be examples of computer system 100 from FIG. 1 but may also take other forms. Secondary event module 109 may be executing on administrative computer system 901 and each of computer systems 902-906 may be executing a copy of primary event module 108. Thus, secondary event module 109 will receive application events from the event modules over communication links 911-917.

Figure 10:
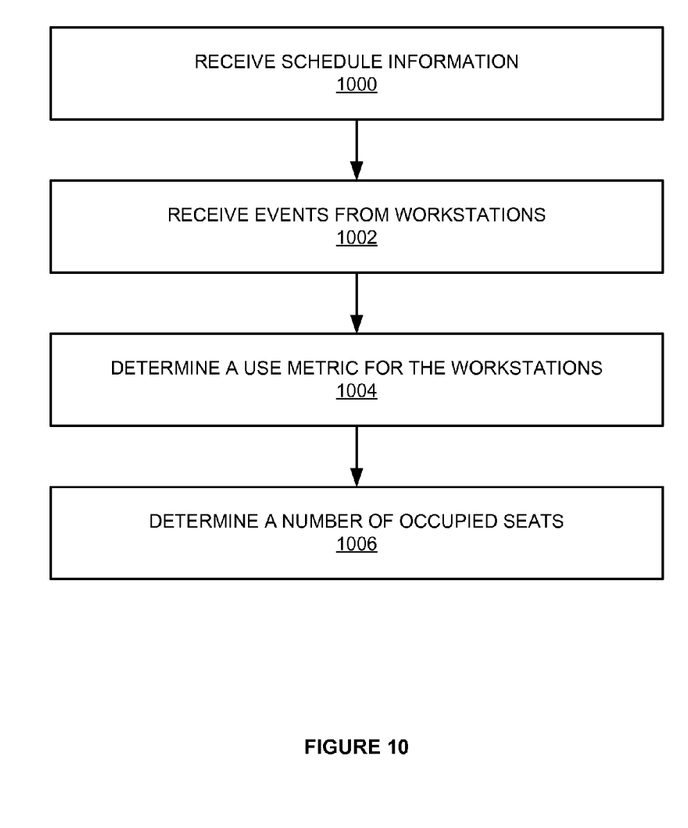
FIG. 10 illustrates the operation of the network computer system for processing computer events.

FIG. 10 illustrates an embodiment of secondary event module 109 processing application events received from primary event modules 108 in network computer system 900. In operation, network computer system 900 may be a computer lab with computer systems 902-906 set up at stations for users to operate and administrative computer system 901 set up as a station for a supervisor to administer the applications running on computer systems 902-906. For example, the computer lab may be a learning computer lab where computerized exams are taken.

The operation begins with secondary event module 109 receiving schedule information regarding a schedule for the use of computer workstations 902-906 (step 1000). The schedule information may include information about an application that is to be used on computer systems 902-906, when that application is supposed to be used, and who is supposed to be using the application. For example, in a computer learning lab, the schedule information may indicate that a calculus test is going to be administered at noon and include a list of students who will be taking the test.

Secondary event module 109 receives application events from primary event modules 108 on computer systems 902-906 including an occurrence time and event type for each event (step 1002). The application events may include login information, which application execution, events within an application, or any other type of event that may occur on a computer system. For example, the application events may indicate to secondary event module 109 which user logged into which computer, whether that user started the exam on time, and where that user is in the process of taking the exam.

Secondary event module 109 then determines a metric for whether each of computer systems 902-906 is in use based on the schedule information, occurrence time, and event type (step 1004). Thus, the metric shows who is using the computer system and how are using the computer system. For example, the metric will show who the user is and whether the user is using the computer to take the calculus test or is using the computer for other purposes, such as checking email.

Secondary event module 109 then determines a number of occupied seats in a room based on the metric (1006). The metric therefore allows secondary event module 109 to determine whether the users of computer systems 902-906 are using computer systems 902-906 in accordance with the schedule. For example, the metric allows secondary event module 109 to take a sort of roll call for computer systems 902-906. The metric may indicate which students are actually taking the test, whether they are taking the test on time, and whether the students are making appropriate progress.

Figure 11:
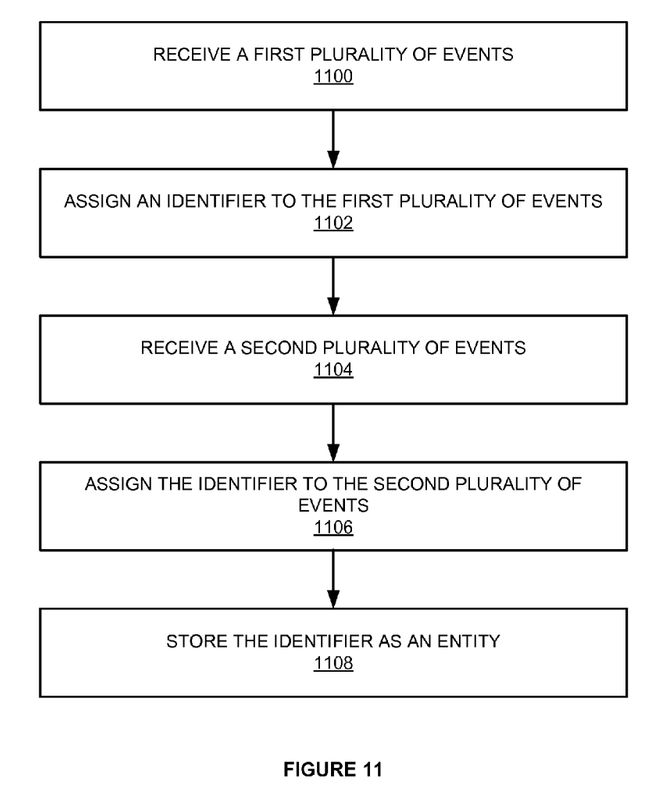
FIG. 11 illustrates the operation of the network computer system for processing computer events.

FIG. 11 illustrates an embodiment of secondary event module 109 processing application events received from primary event modules 108 in network computer system 900. In operation, network computer system 900 may be a customer contact center with computer systems 902-906 set up at stations for call center agents to operate and administrative computer system 901 set up as a station for a supervisor to monitor the activity of the agents using computer systems 902-906.

The operation begins with secondary event module 109 receiving a first plurality of application events associated with a first interaction for a customer from primary event module 108 (step 1100). The application events may be user notifications, events in reaction to user input, events caused by the normal execution of an application, or any other type of event that may occur on a computer system. The interaction could consist of any sort of customer/agent interaction, such as a sales call, tech support, or other inquiry. The interaction may take place over phone, email, text chat, or any other way that an agent and customer can interact. The application events are associated with an interaction for a customer if they occur during an interaction between a customer and an agent using computer system 902. For example, the agent may be on a call with the customer and the application events may occur in an inventory management application or a sales application. Likewise, the application events may occur before or after the actual customer interaction but still be related to the interaction, such as administrative tasks finalizing a transaction.

An identifier associated only with the customer is assigned to the first plurality of application events (step 1102). The identifier could take any form that is unique to the customer, such as a number, code, or customer name. The plurality of events is assigned the identifier so that the events can be identified as pertaining to the customer.

Secondary event module 109 then receives a second plurality of application events associated with a second interaction for the customer from primary event module 108 (step 1104). The second interaction may be the same type of interaction as the first interaction or may be a different interaction with the same customer. The identifier is assigned to the second plurality of events (step 1006). The identifier is the same because the second plurality of application events is associated with the same customer as the first. The second plurality of application events may also be received and assigned the identifier by one of the other computer systems 903-906.

The identifier is stored as an entity along with other associated identifiers in administrative computer system 901 (step 1109). The entity may be defined as a group of identifiers with something in common, such as customers with the same type of business or customers who purchase a certain amount of product. The identifiers are stored on administrative computer system 901 so that administrative computer system 901 can monitor and perform actions with computer systems 902-906 based on the identifiers.

For example, when an indicator is detected because one of computer systems 902-906 is interacting with the customer associated with the customer for the indicator, secondary event module 109 could notify computer systems 902-906 which agent is currently interacting with that customer.

In another example, if the agent using computer system 902 is detected as completing a process for a customer and the agent using computer system 905 is about to perform the same process, then administrative computer system 901 will notify the agent using computer system 905 of this fact. Thus, the agent using computer system 905 could refer to the agent using computer system 902 for assistance if needed. Alternatively, if the two users deal with a customer in succession, for example one agent deals with billing and the other with delivery scheduling, then the delivery agent will be notified when the billing agent is almost finished so that the delivery agent can be prepared.

In another example, if an identifier shows that a customer interaction is taking too long with the user of computer system 902, the secondary event module 109 may perform some action to remedy the issue, such as notifying a supervisor about the issue.

Referring back to FIG. 1, communication interface 101 comprises components that communicate over communication links, such as network cards, ports, RF transceivers, processing circuitry and software, or some other communication devices. Communication interface 101 may be configured to communicate over metallic, wireless, or optical links. Communication interface 101 may be configured to use TDM, IP, Ethernet, optical networking, wireless protocols, communication signaling, or some other communication format—including combinations thereof.

User interface 102 comprises components that interact with a user. User interface 102 may include a keyboard, display screen, mouse, touch pad, or some other user input/output apparatus. User interface 102 may be omitted in some examples.

Processing circuitry 105 comprises microprocessor and other circuitry that retrieves and executes operating software 107 from memory device 106. Memory device 106 comprises a disk drive, flash drive, data storage circuitry, or some other memory apparatus. Operating software 107 comprises computer programs, firmware, or some other form of machine-readable processing instructions. Operating software includes primary event module 108 and secondary event module 109. Operating software 107 may further include an operating system, utilities, drivers, network interfaces, applications, or some other type of software. When executed by circuitry 105, operating software 107 directs processing system 103 to operate information computer system 100 as described herein.

In particular, primary event module 108 communicates with the operating system to detect application events generated by user input and processing the application events to determine if a primary event has occurred. Additionally, secondary event module 109 communicates with the primary event module 108 to obtain an indication of the application events detected by the primary event module and processing the application events to determine if a secondary event has occurred.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computer system to process computer events, comprising:
   a primary event module communicating with an operating system to detect application events generated by user input and processing the application events to determine if a primary event has occurred; and
   a secondary event module communicating with the primary event module to obtain an indication of the application events detected by the primary event module and processing the application events to determine if a secondary event has occurred; wherein an indication of the application events includes an occurrence time for each application event and further comprising the secondary event module:
   receiving process definitions that each define a process based on a sequence of events;
   receiving telephony events, wherein each telephony event indicates an occurrence time;
   processing the application events and the telephony events to determine whether a subset of the application events and telephony events is a first process based on the process definitions;
   determining an occurrence time for the first process based on the occurrence times for the subset of the application and telephony events; and
   displaying the first process on a timeline along with the application events and the telephony events in accordance with the occurrence times of the first process, the application events, and the telephony events.

2. The method of claim 1, wherein the primary event module comprises a browser helper object and the user input is entered into web page displayed in a web browser application.

3. The method of claim 1, wherein the primary event module comprises an accessibility application programming interface (API) for the operating system.

4. The method of claim 1, further comprising:
processing the application events to using recursive substring analysis to identify events that are likely to follow one another;
creating a matrix of the application events that are likely to follow one another; and
graphically displaying the matrix including a visual indication of the application events that are likely to follow one another.

5. The method of claim 1, wherein the indication of the application events includes an occurrence time and event type for each application event and further comprising the secondary event module:
receiving schedule information regarding a schedule for use of a plurality of computer workstations;
determining a metric for whether each of the plurality of computer workstations is in use based on the schedule information, occurrence time, and event type; and determining a number of occupied seats in a room based on the metric.

6. The method of claim 1, further comprising the secondary event module:
receiving an indication of the user input from the primary event module;
determining a user action that should be taken with the computer system by a user based on the user input and the application events; and
generating an instruction to notify the user about the user action that should be taken.

7. The method of claim 1, further comprising the secondary event module:
receiving process definitions that each define a process based on a sequence of events;
processing the application events to determine whether a subset of the application events comprises a first process based on the process definitions even if the subset of application events includes application events that are extraneous to a definition for the first process; and
processing the application events a second time to determine whether a second subset of the application events comprises an incomplete process based on the process definitions even if the second subset of application events includes application events that are extraneous to a definition for the incomplete process.

8. A non-transitory computer readable medium with instructions stored thereon for operating a computer system to process computer events, wherein the instructions, when executed by the computer system, direct the computer system to:
communicate with a primary event module to obtain an indication of application events detected by the application enhancement event module, wherein the primary event module communicates with an operating system to detect the application events generated by user input and determine if a primary event has occurred based on the application events;
process the application events to determine if a secondary event has occurred; and
process the application events to determine if a business process has occurred; wherein the instructions further direct the computer system to:
receive process definitions that each define a process based on a sequence of events;
receive telephony events, wherein each telephony event indicates an occurrence time;
process the application events and the telephony events to determine whether a subset of the application events and telephony events is a first process based on the process definitions;
determine an occurrence time for the first process based on the occurrence times for the subset of the application and telephony events; and
display the first process on a timeline along with the application events and the telephony events in accordance with the occurrence times of the first process, the application events, and the telephony events.

9. The non-transitory computer readable medium of claim 8, wherein the primary event module comprises a browser helper object and the user input is entered into web page displayed in a web browser application.

10. The non-transitory computer readable medium of claim 8, wherein the primary event module comprises an accessibility application programming interface (API) for the operating system.

11. The non-transitory computer readable medium of claim 8, wherein the instructions further direct the computer system to:
process the application events to using recursive substring analysis to identify events that are likely to follow one another;
create a matrix of the application events that are likely to follow one another; and graphically display the matrix including a visual indication of the application events that are likely to follow one another.

12. The non-transitory computer readable medium of claim 8, wherein the instructions further direct the computer system to:
receive schedule information regarding a schedule for use of a plurality of computer workstations;
determine a metric for whether each of the plurality of computer workstations is in use based on the schedule information, occurrence time, and event type; and
determine a number of occupied seats in a room based on the metric.

13. The non-transitory computer readable medium of claim 8, wherein the instructions further direct the computer system to:
receive an indication of the user input from the primary event module;
determine a user action that should be taken with the computer system by a user based on the user input and the application events; and
generate an instruction to notify the user about the user action that should be taken.

14. The non-transitory computer readable medium of claim 8, wherein the instructions further direct the computer system to:
receive process definitions that each define a process based on a sequence of events;
process the application events to determine whether a subset of the application events comprises a first process based on the process definitions even if the subset of application events includes application events that are extraneous to a definition for the first process; and
process the application events a second time to determine whether a second subset of the application events comprises an incomplete process based on the process definitions even if the second subset of application events includes application events that are extraneous to a definition for the incomplete process.

* * * * *